United States Patent [19]
Cavalleri

[11] Patent Number: 5,125,596
[45] Date of Patent: Jun. 30, 1992

[54] FLUID SHIELDED MOVABLE STRUT FOR MISSILE AND ROCKET THRUST VECTOR CONTROL

[76] Inventor: Robert J. Cavalleri, 1605 Gran Via, Orlando, Fla. 32825

[21] Appl. No.: 551,245

[22] Filed: Jul. 11, 1990

Related U.S. Application Data

[63] Continuation-in-part of Ser. No. 355,360, May 23, 1989, abandoned.

[51] Int. Cl.⁵ .................... F42B 10/12; F02K 9/84
[52] U.S. Cl. ........................................... 244/3.22
[58] Field of Search ............. 244/3.1, 3.24, 3.26, 244/3.3, 3.21, 3.22

[56] References Cited

U.S. PATENT DOCUMENTS

| | | | |
|---|---|---|---|
| 1,043,074 | 11/1912 | Davis | 244/3.21 |
| 2,594,766 | 4/1952 | Goodard | 244/75 R |
| 3,094,072 | 6/1963 | Parilla | 244/3.22 |
| 3,136,250 | 6/1964 | Humphrey | 244/3.27 |
| 3,690,596 | 9/1972 | Durran et al. | 244/3.21 |
| 3,692,358 | 9/1972 | Parilla | 244/3.21 |
| 3,711,040 | 1/1973 | Carver | 244/3.21 |
| 3,759,466 | 9/1973 | Evers-Euterneck | 244/3.21 |
| 3,764,091 | 10/1973 | Crowhurst | 244/3.22 |
| 3,806,064 | 4/1974 | Parilla | 244/3.22 |
| 4,384,694 | 5/1983 | Watanabe et al. | 244/3.22 |
| 4,541,592 | 9/1985 | Moll | 244/3.22 |
| 4,561,357 | 12/1985 | Maudal et al. | 102/439 |
| 4,632,336 | 12/1986 | Crepin | 244/3.22 |
| 4,637,572 | 1/1987 | Metz | 244/3.22 |
| 4,867,393 | 9/1989 | Faupell et al. | 244/3.22 |
| 4,903,917 | 2/1990 | Peller et al. | 244/3.21 |

*Primary Examiner*—John B. Sotomayor
*Attorney, Agent, or Firm*—H. Jay Spiegel

[57] ABSTRACT

The present invention relates to a strut assembly which may be selectively projected and retracted with respect to associated structure of a solid or liquid propellant rocket or a missile, with such structure comprising one of, for example, a nozzle thereof or the body thereof. The inventive strut may be projected either internally of the nozzle or externally of the missile body, as desired. Coolant is supplied to the strut through internal passages therein and the coolant is exhausted therefrom to cool the strut, to protect the strut against particulate impaction, and to enhance the area footprint of the shocked region.

15 Claims, 5 Drawing Sheets

VELOCITY VECTOR PLOT
NO INJECTION

FORWARD STAGNATION POINT

VELOCITY VECTOR PLOT
INJECTION AT PROBE
FRONT FACE

FORWARD STAGNATION POINT    INJECTION LOCATION

VELOCITY VECTOR PLOT
INJECTION AT FORWARD
STAGNATION POINT

FORWARD
STAGNATION
POINT    INJECTION LOCATIONS

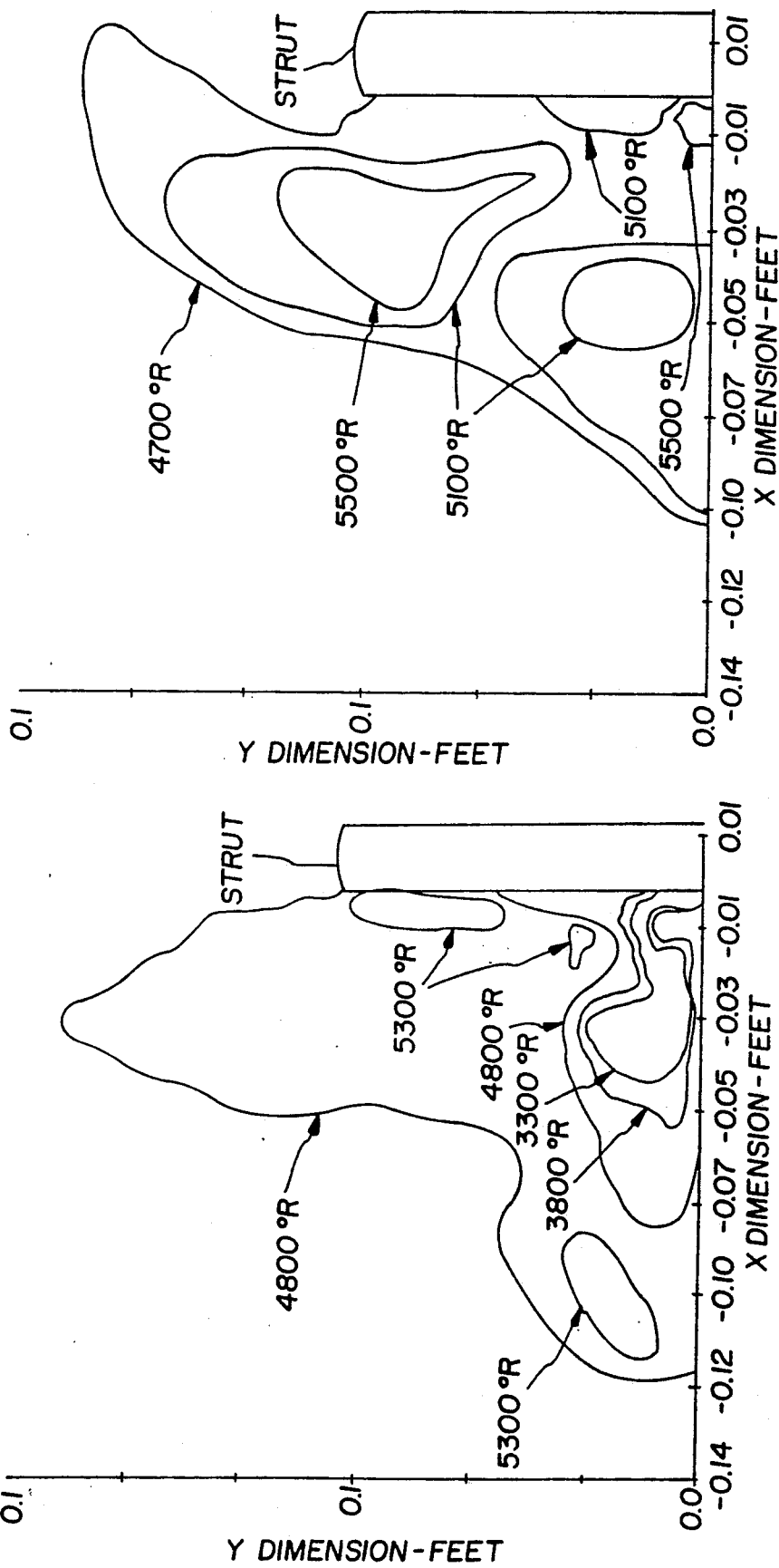

FLUID SHIELDED MOVABLE STRUT FOR MISSILE AND ROCKET THRUST VECTOR CONTROL

This application is a continuation-in-part of Ser. No. 07/355,360 filed May 23, 1989, now abandoned.

BACKGROUND OF THE INVENTION

It is well known that steering or guidance of missiles and rockets can be accomplished by external aerodynamic surfaces such as fins or by vectoring of the rocket nozzle thrust. The thrust vectoring of rockets can be obtained with the use of either fluid dynamic means or mechanical means. The fluid dynamic guidance technique commonly referred to as secondary injection thrust vector control (SITVC), liquid injection thrust vector control (LITVC) or jet interaction (JI) employ injection of gas or liquid into the exhaust nozzle or external air stream through an appropriate surface. The mechanical techniques for rocket thrust vectoring can involve moving the nozzle exhaust bell by gimballing at the nozzle throat or jet tabs at the nozzle exit plane. The mechanical means for missiles use external movable fins such as those disclosed in U.S. Pat. Nos. 1,043,074 to Davis, 3,136,250 to Humphrey and 3,759,466 to Evers-Euterneck. Insertion of a solid body into the exhaust nozzle or external air stream can have the same effect as the fluid dynamic technique, but such may require the use of materials that are capable of withstanding the high temperature and possible erosive particulates in the adjacent gas stream.

U.S. Pat. No. 3,749,317 to Osofsky discloses an obstruction which may be reciprocated into the jet stream of a jet engine through activation of an explosive squib by electrical detonation. The Osofsky device is not controllably retractable and only has a one-time use.

An alternative to all of the foregoing for applications to a rocket nozzle is to employ an actively cooled body or strut that is inserted for a preascertained distance through the nozzle wall. The underlying basis for the technique is that injection of a gas or liquid on the interior of the nozzle wall causes a disturbance in the supersonic nozzle exhaust flow that in turn generates a shock wave inside the nozzle. Also associated with the gaseous or liquid injection is a separated flow region which generates a different, higher pressure than that on the diametrically opposite wall and therefore causes a thrust imbalance or offset. This force imbalance results in a turning moment and vectoring of the force generated by the rocket nozzle.

The nozzle exhaust stream can be composed of only high stagnation temperature gas (6000° R) as is the case for liquid propellant rockets or scramjets or both high temperature gases and liquid and solid particulates. Materials do not exist that can survive the high temperature erosive gas exhaust stream for any long period of time (i.e. 30 seconds or longer). The presence of liquids from rocket propellant combustion products such as aluminum oxide create a more severe environment. This is because when the aluminum oxide liquid impacts the solid body, it solidifies and gives up its heat of condensation to the material. This causes local hot spots on the strut which can cause the strut to locally approach its yield stress and thereby cause pitting. Solid particles have a similar pitting effect on the strut surface.

For these reasons, in the prior art, liquid or gas streams were injected through the nozzle wall on demand to give the degree of thrust vector desired. These pure gas and liquid injection techniques required large amounts of consumable injectants and therefore have a tendency to increase missile weight and decrease payload.

It was to improve upon such prior art techniques that the present invention was evolved.

SUMMARY OF THE INVENTION

As will be set forth at greater length hereinafter, applicant has herein provided a highly advantageous, fluid shielded and enhanced strut for thrust vector control and missile guidance, in the operation of which, fluid is supplied in close proximity to the strut, to give a cold gas buffer region around the strut, thus to effectively deflect any erosive particulates that would be harmful to the strut.

With regard to the solid rocket motor thrust vector control, applicant's invention is particularly important from the standpoint of preventing impact by liquid particulates. This is because liquid particulates create considerable damage in that they change state upon contacting a probe, strut or the like, and in so doing give up their latent heat of vaporization. Applicant's novel movable strut design advantageously necessitates only a small amount of consumables to protect and also enhance the solid strut body thrust vector control performance. The fluid, injected through a multiplicity of orifices provided in a carefully designed pattern, (either gas or liquid) serves a multiplicity of purposes. One purpose is to bathe the strut or probe in a stream that is relatively cool when compared to the temperature of the nozzle exhaust gas which reduces heat load to the strut due, in part, to the said carefully designed pattern. A second purpose is to deflect the particulates away from and around the strut, and a third purpose is to enhance the area footprint of the shocked region. The amount of injectant is therefore quite advantageously and substantially reduced over the previous pure gas or liquid injection techniques of the prior art.

A primary object of applicant's invention is therefore to provide a fluid shielded and enhanced movable strut for thrust vector control and missile guidance, such strut being usable either in the interior nozzle wall of a liquid or solid fueled rocket engine, or on the exterior of an air breathing, rocket propelled or gun launched missile.

It is a further object of the invention to provide a movable probe or strut for thrust vector control, in which carefully controlled quantities of a suitable coolant are caused to flow from the outermost portion of the strut and the region immediately adjacent to the strut, to effectively shield the strut against the highly erosive effect of particulates in the high velocity gas flow.

Still another object of the invention is to provide ample cooling and enhanced thrust vector for a missile by the use of a strut constructed to move into a desired projecting attitude by the pressure of a selected fluid.

These and other objects, features and advantages of the present invention will be better understood from the following detailed description of the preferred embodiments when read in conjunction with the appended drawing figures.

BRIEF DESCRIPTION OF THE DRAWINGS

FIGS. 11 and 12 show the effect on temperature of the injection of coolant into the separated flow region.

DETAILED DESCRIPTION OF THE PREFERRED EMBODIMENTS

Figure 8:
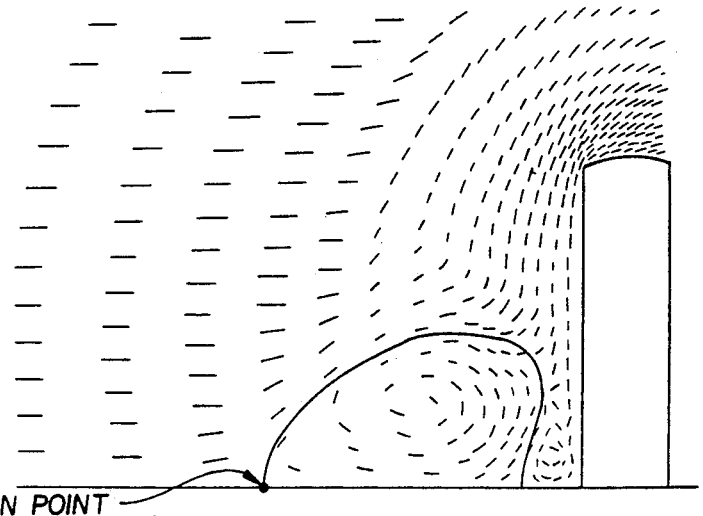
FIGS. 8, 9 and 10 show Velocity Vector Plots for, respectively, no injection, injection at probe front face and injection at forward stagnation point.
Figure 9:
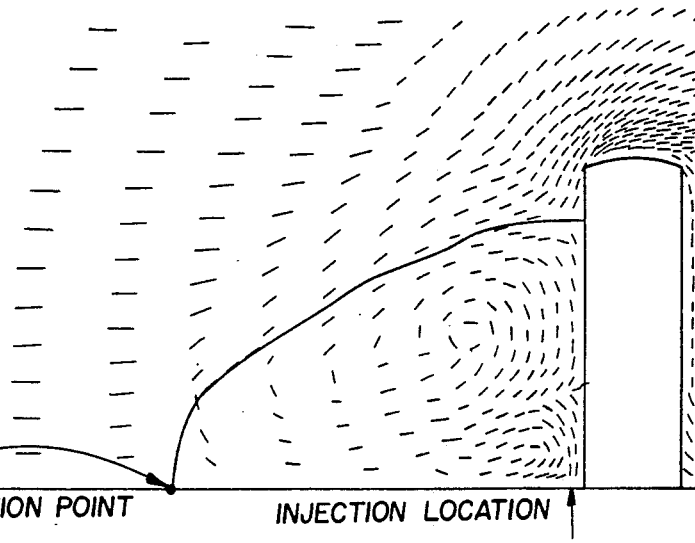
Figure 10:
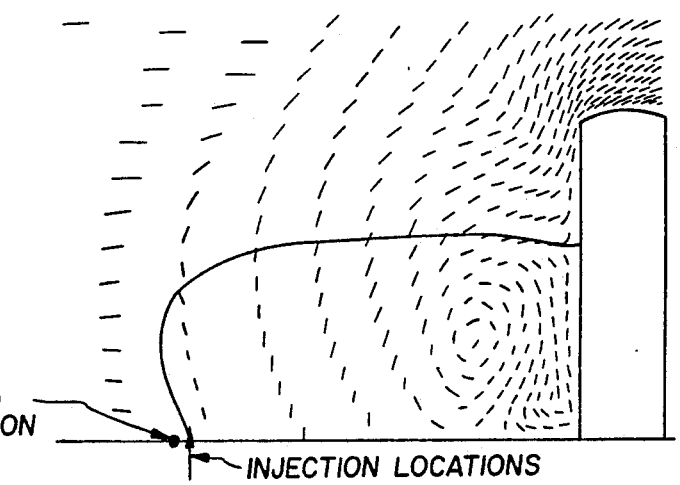

With reference to FIGS. 8–12, in general, the supersonic flowfield over a body is comprised of a viscous region which is directly adjacent to the wall of the body and an inviscid region which lies external to the viscous region. If a sufficiently large protruberance, such as a strut, is placed on the body, it will generate a shock wave. The pressure rise generated by the shock wave will cause the flow in the boundary layer to separate. An additional object of the invention is to set up such a separated flow region as depicted in FIG. 8. The results in FIGS. 8–12 were obtained through the use of a Computational Fluid Dynamics (CFD) code which solves the Navier Stokes equations. FIG. 8 is a side view of a cross-sectional plane taken down the center line and upstream of the strut forward surface. This separated flow region will have a reverse flow region, which is shown in FIG. 8 and is denoted by a forward stagnation point. The injection of a phase changing liquid or a gas which is lower in temperature than the nozzle hot gas stream or the hot external air stream or that can function as a heat sink will result in a buffer of relatively cool gas being entrained in the region immediately upstream of the strut as illustrated in FIGS. 9 and 10. The injection location in FIG. 9 is immediately upstream of the strut and the injection location in FIG. 10 is slightly downstream of the forward stagnation point. It is important that all injection be performed in the separated flow region and that no injection occur upstream of the forward stagnation point. This greatly improves the performance of injectant by ensuring that it has a maximum residence time in the immediate vicinity of the strut and does not very rapidly mix with the impinging hot gas stream or get convected away by the impinging hot gas stream. As a result, this will reduce the heat load to the strut. This thermal load problem was envisioned in U.S. Pat. No. 3,246,468 to Wilhite. His approach to solve the problem was to continuously supply solid struts or bodies with the use of the mechanism described in his patent. The present invention resolves this problem by injecting a consumable fluid into the separated flow region which surrounds the strut.

The effect of injecting coolant into the separated flow region on the temperature in this region is shown in FIGS. 11 and 12. In FIG. 11, the temperature distribution for the case with no injection is shown. In FIG. 12, the temperature distribution with injection is shown. As can be seen by comparing FIGS. 11 and 12, the use of injection has lowered the temperature (and thus the heat load to the strut) in the vicinity upstream of the strut. This is very evident, especially at the corner where the strut and the body meet. The temperature without injection reaches values on the order of 5100° to 5500 degrees Rankine. With injection, the temperature in this region is in the range of 3300° to 3800 degrees Rankine. The amount of gas injection for the case shown was approximately 10% of the impinging hot gas stream. At larger injection flow rates or for injection of a phase changing coolant, the extent of this cool region would be larger. In addition, injection through the strut surface would further reduce the heat transfer to the strut.

Figure 1:
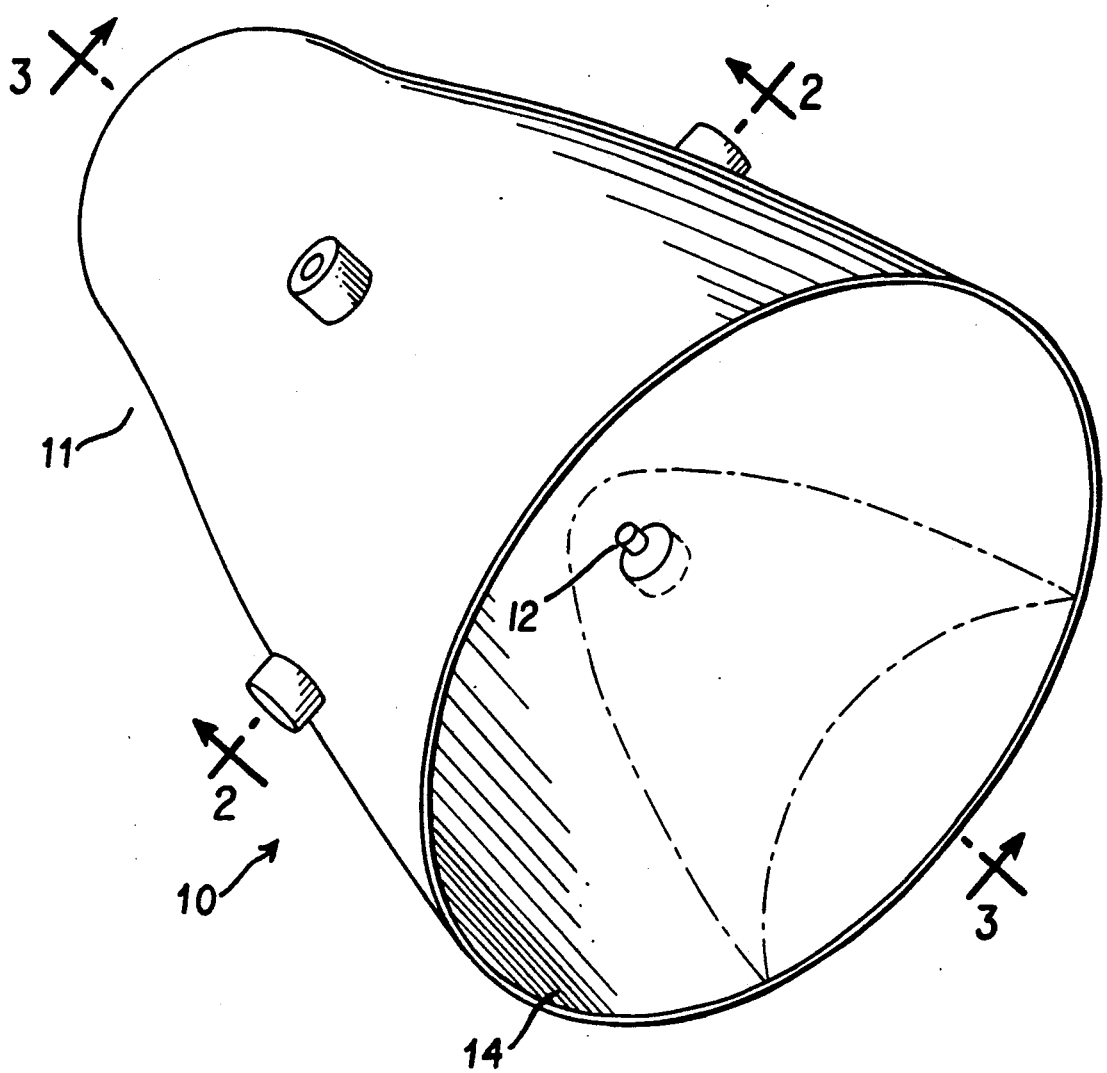
FIG. 1 is a perspective view taken from the rear of a typical nozzle modified so as to utilize a plurality of applicant's novel struts in an ordered relationship in the interior of Applicant's nozzle.
Figure 2:
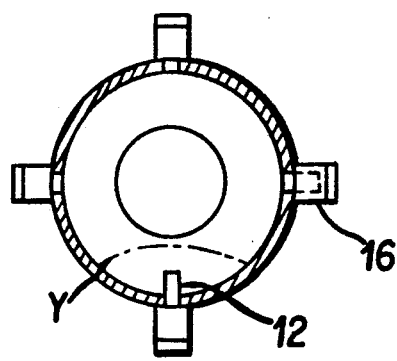
FIG. 2 is a cross-sectional view to a somewhat smaller scale of the strut relationships as viewed on lateral cutting plane 2—2 of FIG. 1.
Figure 3:
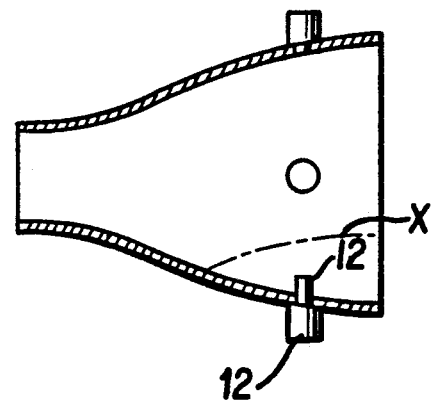
FIG. 3 is a cross-sectional view, also to a somewhat smaller scale, of the strut relationships as viewed on longitudinal cutting plane 3—3 of FIG. 1.

Referring to FIG. 1, an actively cooled strut arrangement 10 is shown for use in the nozzle 11 of an engine (not shown), such as a liquid or solid propellant rocket engine or an advanced air breathing engine. The movable probe or strut 12 forming the principal ingredient of applicant's invention is shown in this instance being appropriately mounted with respect to the interior wall 14 of a missile or rocket nozzle. As revealed in FIGS. 2 and 3, representing a lateral cross-sectional view and a longitudinal cross-sectional view, respectively, a suitable actuator 16 is utilized for bringing about a proper control over the motions undertaken by each of the movable struts 12. Many devices are known to be useable to cause reciprocation of a device or structure such as, for example, pneumatic, hydraulic or electrical means. The particular means employed may be as desired, depending upon the particular circumstances of the application. As is obvious, the struts are operated differentially in order to bring about desirable steering forces upon the air breathing missile or the rocket powered missile utilizing applicant's invention.

In FIG. 1, the four struts are illustrated as being located approximately halfway between the throat and the exit plane. Applicant has found that if these struts are located too far downstream, the area cut by the shock envelope is not large enough for the generation of adequate turning forces. On the other hand, if the struts are located too far upstream, the shock envelope will intersect on the upper nozzle surface in addition to the lower nozzle surface, and this likewise would result in reduced turning forces.

The objective of proper strut location is best served by maximizing the area generated by the intersection of the shock envelope and half of the nozzle wall. This is usually achieved by placing the struts nominally at the halfway point, or stated differently, the struts are to be placed at a location that falls within the range of being 40% to 60% of the nozzle length.

The nozzle may be regarded as beginning at a location of minimum area, which is termed the throat, and terminates at the location of maximum area.

FIGS. 2 and 3 illustrate a parabolically shaped shock envelope, which is created when the flow is supersonic, which envelope intersects the nozzle wall at dashed line X, whereas the dashed line Y represents the upper limit of the shock envelope.

It is to be understood that the strut or probe 12 and its actuator 16 are usually never used singly, and typically four struts and their respective actuators are utilized at spaced intervals around the nozzle 14, as depicted in the first several figures. Normally the struts or probes are placed at the same distance from the longitudinal centerline 20 of the missile, but they also could be staggered along the missile centerline. Each of the struts can have a circular cross-section, but obviously applicant is not limited to this, for each strut can alternatively have an oval, an elliptical cross-section or an asymmetric cross-section with surface passages for preferred fluid positioning. It is to be understood that each strut is carefully fitted into its actuator body, as will be discussed hereinafter.

Figure 4:
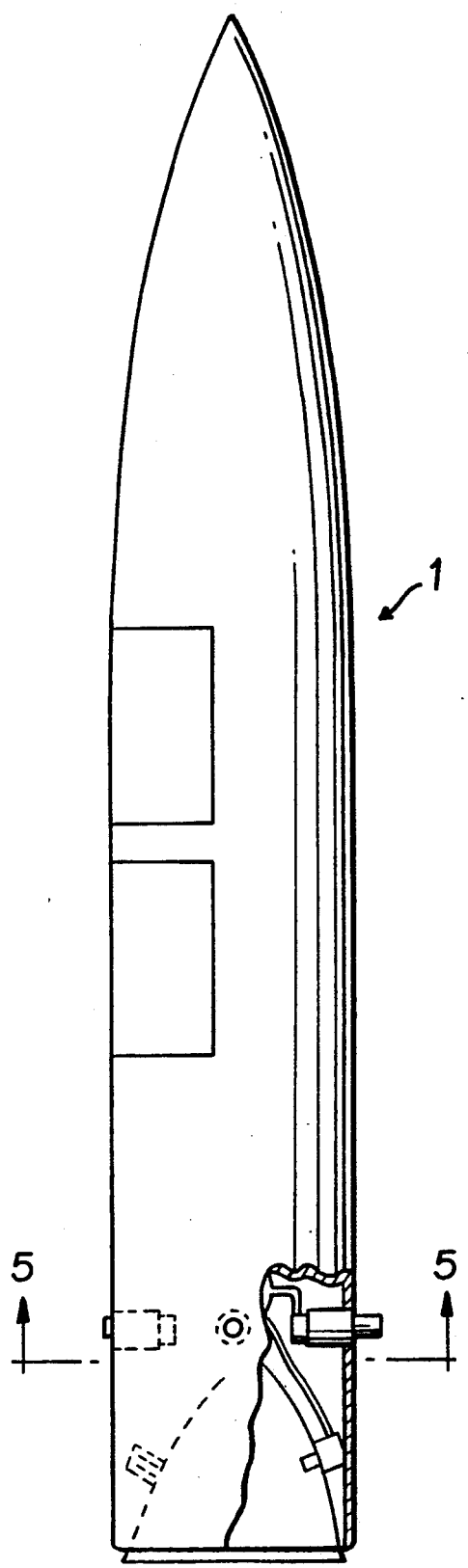
FIG. 4 is a generalized view for illustrating the utilization of Applicant's novel struts for the steering of a missile.
Figure 5:
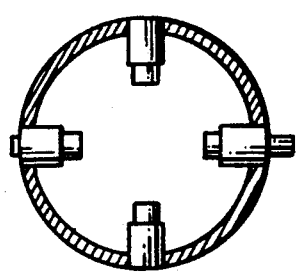
FIG. 5 is a cross-sectional view taken along lines 5—5 in FIG. 4.

FIG. 4 represents an application of applicant's novel struts to an external surface on a missile 1, thus to indicate the application of applicant's invention for missile guidance at a location in which the struts will be effective, even after motor burnout. Both FIG. 4 as well as FIG. 5 depict the manner in which steering is brought about by causing a selected strut to extend so as to bring about a turning moment.

Figure 6:
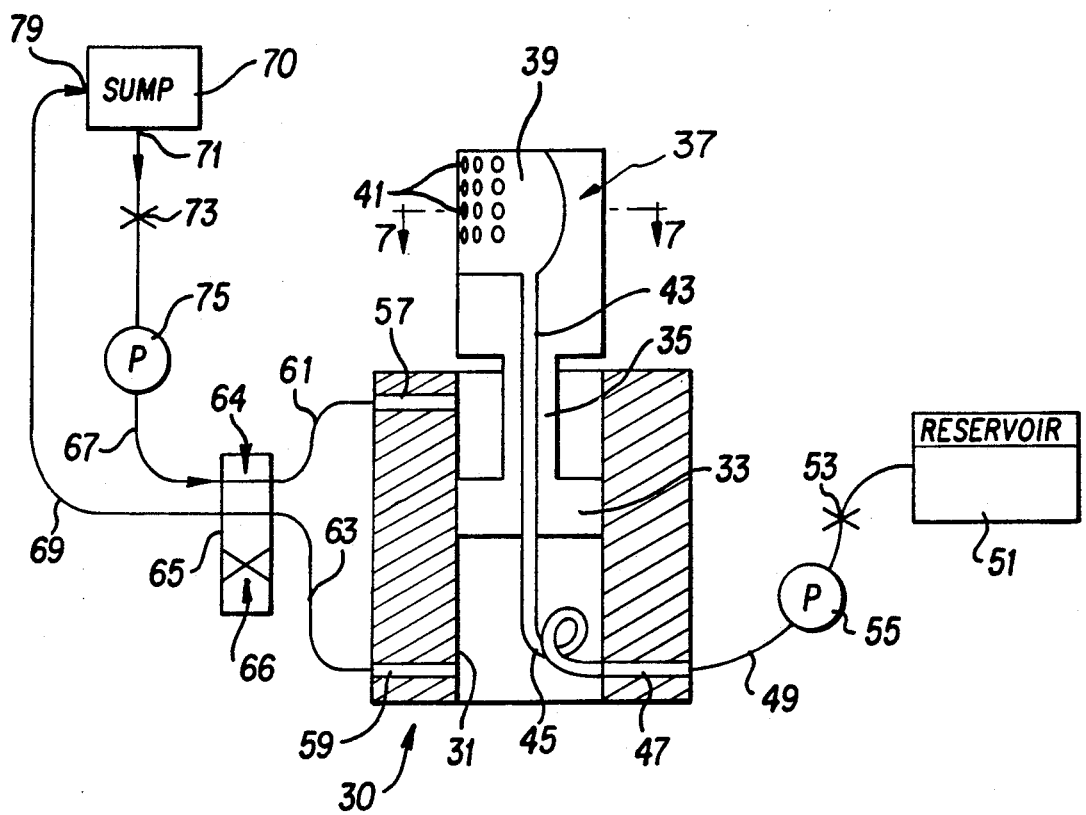
FIG. 6 shows a side schematic view of an actively cooled strut in accordance with the teachings of the present invention.

With reference to FIG. 6, a schematic representation of the manner of actuation of a movable strut and the manner of supply of cooling fluid thereto is shown. A housing 30 is provided which contains a cylinder 31 in which is slidably received a piston 33 having a piston rod 35 attached thereto and to which is attached the inventive strut 37.

Figure 7:
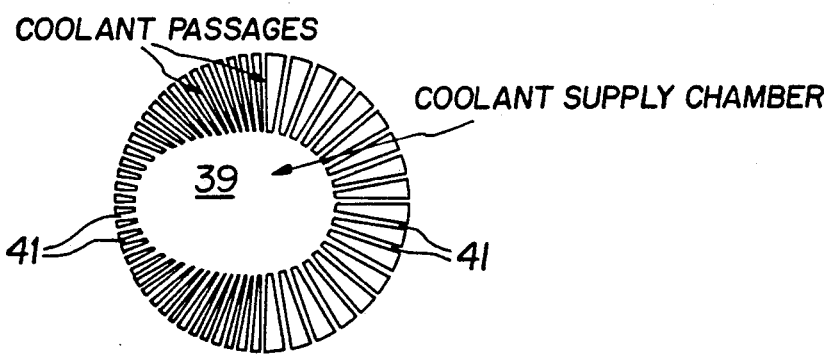
FIG. 7 shows a cross-sectional view along the line 7—7 of FIG. 6.

The strut 37 includes an internal chamber 39 which is connected to the exterior atmosphere by virtue of a multiplicity of small orifices 41. A passageway 43 through the strut 37, rod 35 and piston 33 communicates with the chamber 39, on the one hand, and with a flexible conduit 45 on the other hand. The use of a multiplicity of strategically placed orifices 41 communicating chamber 39 with ambient as shown in FIG. 6 will further reduce the heat load to the strut. The pressure variation around the circumference of the strut, is caused by the passages supplying the coolant having different lengths as shown in FIG. 7, in a predetermined pattern, so that the coolant pressure distribution follows that of the impinging stream. The chamber 39 has an oblong egg-shaped cross-section as shown in FIG. 7. Less (if any) coolant is needed on the side and back of the strut than on the front of the strut. Thus, the use of a variation in passage geometry allows for optimization and efficient use of the amount of coolant consumed. If a gas is employed as the coolant, then the orifices would be designed so that the flow is choked at the orifice exit and thus the impinging gas stream cannot influence the coolant mass flow rate. If a liquid coolant were employed, the use of different passage geometries would serve to meter the amount of coolant around the circumference of the strut. Also, it may be advantageous to build a sufficient pressure drop into the liquid coolant passage so that the passage acts as a capillary tube which results in a large enough pressure drop so that the coolant is immediately vaporized as it exits from the passage. This results in all of the latent heat of vaporization being used to cool the immediate surface, rather than having excess unvaporized liquid coolant being entrained in the impinging hot gas stream and being convected downstream where it would have no or minimum cooling benefit to the strut. An example of the circumferential variation in coolant passage is illustrated in FIG. 7.

The housing 30 is provided with a passageway 47 therethrough which communicates with the conduit 45, on the one hand, and with a conduit 49 on the other hand communicating with a reservoir 51 of cooling fluid via a valve 53 and a pump 55. As should be understood, the valve 53 may be selectively opened and closed and the pump 55 may be selectively activated and deactivated to control flow of cooling fluid from the reservoir 51 through the conduit 49, passage 47, conduit 45, passage 43, chamber 39, and thence out the orifices 41.

With further reference to FIG. 6, it is seen that passageways 57 and 59 communicate, on the one hand, with the interior of the cylinder 31 and on the other hand with respective conduits 61 and 63. A four port reversing valve 65 is interposed between the conduits 61 and 63 an further conduits 67 and 69. The conduit 67 is connected to the outlet 71 of a sump 70 via a valve 73 and a pump 75. The conduit 69 directly connects with an inlet 79 of the sump 70.

As should be understood, with the four port reversing valve 65 in the position shown, hydraulic fluid from the sump 70 may be supplied to the upper sub-chamber of the cylinder 31 above the piston 33 via the outlet 71, valve 73, pump 75, valve 65, conduit 61 and passage 57 to cause the piston 33 and, thereby, the strut 37 to move downwardly in the view of the figure. At the same time, hydraulic fluid in the lower sub-chamber of the cylinder 31 will exhaust therefrom via the passage 59, conduit 63, valve 65, conduit 69 and inlet 79 to the sump 70.

If it is desired to move the strut upwardly in the view of FIG. 6, suitable means is employed to move the four port reversing valve upwardly in the figure to remove the internal valve passages 64 from communication with the passages 61, 63, 67 and 69 and to place the internal valve passages 66 in communication therewith. In such position of the valve 65, fluid from the sump 70 is provided under pressure to the lower sub-chamber of the cylinder 31 via the outlet 71, valve 73, pump 75, passage 67, valve 65, conduit 63 and passage 59. As the piston 33 moves upwardly in the view of FIG. 6, fluid from the upper sub-chamber of the cylinder 31 exhausts to the sump 70 via the passage 57, conduit 61, valve 65, conduit 69, and inlet 79.

It should be understood, concerning the sub-system described above with regard to supply of coolant to the strut 37, that the pump 55 may be eliminated by providing the reservoir 51 as a pressurized reservoir whereby flow of coolant to the strut may be controlled merely by controlling the valve 53.

As explained hereinabove, the supplying of coolant to the strut 37 serves a multiplicity of purposes. Firstly, supply of coolant bathes the strut in a stream which is relatively cooled when compared to the temperature of the nozzle exhaust gas to thereby protect the strut against deterioration. Further, supply of coolant to the strut is effective to deflect particulates away from and around the strut, also to prevent damage thereto. Finally, supply of coolant to the strut enhances the area footprint of the shocked region.

As should now be apparent, Applicant's novel strut effectively combines a fluid injection technique with the presence of a solid body to achieve a potential missile guidance or thrust vector control system possessing highly desirable attributes. Applicant's contribution is thus to be seen as involving a highly advantageous, fluid shielded strut that may be regarded as a fluid enhanced strut for rocket and missile guidance. In the operation of applicant's device, coolant may be supplied in close proximity to the strut, to give a cold gas buffer region around the strut, thus to effectively deflect any erosive particulates that would be harmful to the strut.

Applicant's novel missile and rocket guidance strut is clearly simpler, lighter in weight, lower in cost and causes a reduced drag penalty than the use of external fins (for missiles) and flexible nozzle seal or a liquid injection thrust vector control technique for rocket motor applications and reduces the drag of finned missile guidance systems. Applicant's invention manifestly has a considerably higher reliability for a successful mission than does a movable nozzle, and it effectively prevents impact by liquid particulates, which create considerable damage in that they change state upon contacting a probe, strut of the like, and in so doing give up their latent heat of vaporization which can contribute to the structural failure of the probes.

As such, an invention has been disclosed in terms of the preferred embodiments thereof which fulfills each and every one of the objects of the invention as set forth hereinabove.

Of course, various changes, modifications and alterations in the teachings of the present invention may be contemplated by those skilled in the art without departing from the intended scope and spirit thereof. As such, it is intended that the present invention only be limited by the terms of the appended claims.

I claim:

1. In a projectile having a body and flying through forces supplied by propulsion means having at least one nozzle having an axis of elongation, the improvement comprising a thrust vectoring strut mounted on said projectile to extend exteriorly of said body in a direction non-aligned with said axis and movable between a first retracted position and a second extended position by actuator means, means for supplying coolant to a chamber in said strut and a multiplicity of orifices comprising respective termini of respective passageways extending generally normal to said direction and connecting said chamber with atmosphere at locations on said strut which are exposed exteriorly of said body when said strut is extended, said orifices having fixed passage lengths which are varied with respect to one another in a desired pattern.

2. The invention of claim 1, wherein said actuator means comprises a piston connected to said strut and slidably mounted in a cylinder and means for supplying said cylinder with pressurized fluid to move said piston in one direction or the other.

3. The invention of claim 1, wherein said coolant supplying means comprises a coolant reservoir and a passageway connected to said reservoir and supplying coolant to said strut.

4. The invention of claim 3, wherein said chamber is in fluid communication with said passageway, said coolant being supplied in close proximity to said strut within a separated region envelope.

5. The invention of claim 3, wherein said coolant reservoir is pressurized, and further including a valve in said passageway.

6. The invention of claim 1, including a plurality of struts.

7. The invention of claim 1, wherein said strut is mounted to extend within said nozzle.

8. The invention of claim 1, wherein said multiplicity of exit orifices are arranged in at least two rows of orifices with each row including a plurality of said orifices.

9. In a projectile having a body and flying through forces supplied by propulsion means having at least one nozzle having an axis of elongation, the improvement comprising a thrust vectoring strut mounted on said projectile to extend within a said at least one nozzle in a direction non-aligned with said axis, said strut being movable in said direction between a first retracted position and a second extended position by actuator means, means for supplying coolant to said strut and said strut having an internal chamber communicating with said supplying means and having a multiplicity of exit orifices communicating said internal chamber with an interior of said at least one nozzle when said strut is extended to a predetermined degree, said multiplicity of exit orifices being arranged in at least two rows of orifices with each row including a plurality of said orifices, said orifices comprising respective termini of respective passageways extending generally normal to said direction, said passageways having fixed passage lengths which are varied with respect to one another in a desired pattern.

10. The invention of claim 9, including a plurality of struts for each said nozzle.

11. The invention of claim 9, wherein said coolant supplying means comprises a coolant reservoir and a passageway supplying coolant from said reservoir to said internal chamber.

12. In a projectile having a body and flying through forces supplied by propulsion means having at least one nozzle having an axis of elongation, the improvement comprising first thrust vectoring strut means mounted on said body for extension exteriorly of said body in a direction non-aligned with said axis and second thrust vectoring strut means mounted on said at least one nozzle for extension interiorly therewithin in a direction non-aligned with said axis, and means for supplying coolant to said first and second strut means.

13. The invention of claim 12, wherein each of said first and second strut means includes an internal chamber fluidly connected to said supplying means and having a multiplicity of exit orifices connecting said internal chamber exteriorly of a respective said strut means.

14. The invention of claim 13, wherein said orifices are arranged in a plurality of rows each including a plurality of orifices.

15. The invention of claim 13, wherein said orifices comprise respective termini of respective passageways having fixed passage lengths which are varied with respect to one another in a desired pattern.

* * * * *